United States Patent [19]

Pohjola

[11] 4,051,914

[45] Oct. 4, 1977

[54] ENDLESS TRACK VEHICLE HAVING A STEERABLE END AND METHOD FOR OPERATING THE SAME

[76] Inventor: Jorma Toivo Tapani Pohjola, Haravatie 6, 90530 Oulu 53, Finland

[21] Appl. No.: 652,823

[22] Filed: Jan. 27, 1976

[30] Foreign Application Priority Data

Jan. 30, 1975 Finland .................................. 750243

[51] Int. Cl.² ............................................. B62D 11/22
[52] U.S. Cl. ................................................... 180/9.44
[58] Field of Search .......................... 180/9.44; 305/44

[56] References Cited

U.S. PATENT DOCUMENTS

| 758,757 | 5/1904 | Jones | 180/9.44 |
| 789,874 | 5/1905 | Owen | 180/9.44 |
| 3,938,607 | 2/1976 | Pohjola | 180/9.44 |

FOREIGN PATENT DOCUMENTS

| 297,810 | 7/1932 | Italy | 180/9.44 |

*Primary Examiner*—Richard J. Johnson

*Attorney, Agent, or Firm*—Steinberg & Blake

[57] ABSTRACT

An endless track vehicle one end at least of which is steerable, as well as a method for operating the same. Front and rear end roll structures guide an endless track vehicle for movement, and at least one of these structures can be angularly displaced with respect to the frame of the vehicle for the purpose of executing a turn during which one side of the track becomes shorter while the opposite side thereof becomes longer. In order to execute a turn, one of the end roll structures is angularly displaced about an upright axis in a substantially horizontal plane, and at the same time this one end roll structure is free to assume an angular position determined by the endless track which engages the latter end roll structure. A connecting structure is provided for connecting at least the one angularly displaceable end roll structure to the frame of the vehicle, this connecting structure providing for the angular displacement of the one end roll structure to execute a turn while at the same time providing for the end roll structure the capability of freely assuming an angular position determined by the endless track itself.

18 Claims, 7 Drawing Figures

ENDLESS TRACK VEHICLE HAVING A STEERABLE END AND METHOD FOR OPERATING THE SAME

BACKGROUND OF THE INVENTION

The present invention relates to vehicles and in particular to endless track vehicles.

The present invention is particularly involved with the steering of such vehicles, the endless track becoming shorter on one side and longer at an oppoite side when the vehicle executes a turn.

The endless track of the vehicle is guided around a pair of end rolls and one or both of these end rolls are angularly displaced with respect to an upright axis so as to bring the track into a curved configuration for executing a turn.

The present invention relates in particular to a method and structure for causing an endless track vehicle of the above type to execute turns.

In connection with the present state of the art, reference may be made to Finnish Pat. No. 46,708 as well as U.S. Pat. Nos. 3,548,762 and 3,565,198.

One of the problems encountered with endless track vehicles of the above type resides in the large amount of power required for steering such vehicles. Thus, in order to steer such vehicles it is necessary to provide the endless track with a curved configuration, and because of the construction of the endless track itself as well as the relatively large load normally carried thereby and the large area of frictional contact with the surface on which the vehicle travels, undesirably large forces are required in connection with steering such vehicles. Not only are there steering forces undesirably large, but in addition they transmit undesirably great stresses to the track itself. These undesirable stresses are encountered particularly when executing turns having relatively small radii of curvature. During execution of turns with vehicles of the above type there are undesirable lateral movements resulting from elastic yielding of the track, and these tendencies give rise to discomfort in the driving of the vehicle.

A further problem encountered with vehicles of the above type is that the track of the vehicle tends to dig itself into the ground at the front part of the track at the inner side of a turn executed thereby.

SUMMARY OF THE INVENTION

It is accordingly a primary object of the present invention to provide a method and structure according to which an endless track vehicle will avoid the above drawbacks.

A more specific object of the invention is to provide a method and structure which will enable a vehicle of this type to be steered with lighter and smaller steering forces than have heretofore been required.

It is also an object of the present invention to provide with the method and apparatus of the vehicle of the invention a moment which will assist in the steering of the vehicle.

A further object of the invention is to reduce the extent to which the track is stressed during execution of turns.

Also it is an object of the present invention to provide a method and apparatus which will eliminate the lateral movements resulting from elastic yielding of the track, and thus increase in this way the driving comfort.

A further object of the invention is to provide a method and structure which will reduce the tendency of the track to burrow into the surface on which the track travels.

A method of operating a vehicle which has front and rear end roll means and an endless track means guided around the front and rear end roll means and capable of becoming shorter on one side and longer on an opposite side when the vehicle executes a turn, includes, in accordance with the invention, the step of angularly displacing at least one of the end roll means about an upright axis in a substantially horizontal plane when executing a turn with the vehicle, while freeing this one end roll means, simultaneously with the angular displacement thereof, to assume an angular position determined by the endless track means itself.

The vehicle of the invention includes a frame means as well as an endless track means extending longitudinally of the frame means and capable of becoming longer on one side and shorter at an opposite side when the vehicle executes a turn. Front and rear end roll means are provided and the endless track means extends around the front and rear end roll means to be guided thereby during travel of the vehicle. A connecting means of the invention connects at least one of these end roll means to the frame means for angular displacement with respect thereto about an upright axis during execution of a turn, and this connecting means provides for this one end roll means the capability of assuming an angular position determined by the endless track means.

Thus, in order to achieve the above objects as well as others which will become apparent from the description below, the method of the invention is mainly characterized in that the shaft of an end roll which guides a track is arranged so as to be capable of assuming in an unrestricted manner, or in a positively guided or spring-loaded manner, primarily in a horizontal plane a position which is naturally imparted to or prescribed for the shaft by the curving track.

The structure according to the invention is characterized in that between the shaft of the end roll which guides the track and the vehicle frame component which turns the end roll there has been provided a substantially vertical pivot or pivots.

The method and structure of the invention are applicable to all types of track vehicles including those which have two endless tracks arranged in side-by-side relation. The invention also is applicable either to a vehicle which is capable of being steered at its front end alone or to a vehicle which is capable of being steered by angular displacement of the track at both the front and the rear ends of the vehicle.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
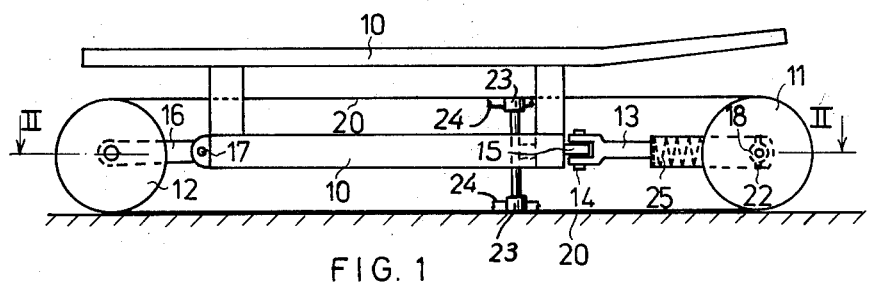
FIG. 1 is a schematic side elevation of one possible embodiment of an endless track vehicle according to the invention.

In the particular examples of the invention which are illustrated in the drawings, the endless track means 20 is curved only at its front end region. It is to be understood, however, that the invention is equally applicable to vehicles where both the front and the rear end regions of the endless track means are capable of being curved.

The vehicles schematically illustrated in the drawings include a frame means 10. This frame means 10 carries conventional units such as the engine and transmission which have not been illustrated. The illustrated vehicle includes a front end roll means 11 and a rear end roll means 12. Only the front end roll means 11 is capable of being turned about a substantially upright axis for the purpose of steering the vehicle. As is apparent particularly from FIGS. 1 and 2, the front end roll means 11 includes a horizontal shaft means 18 which carries a plurality of roll means in the manner illustrated. The rear end roll means 12 also includes a horizontal shaft 19 and a plurality of rolls carried thereby. The frame means 10 carries at its rear portion horizontal pivots 17 which serve to pivotally connect arms 16 to the frame means 10, these arms 16 having openings through which the shaft 19 passes so that in this way the rear end roll means 12 is operatively connected with the frame means 10. The arms 16 are provided with unillustrated springs and also, in some cases, with shock absorbers. However, the arms 16 themselves may be in the form of spring arms which are elastically yieldable. In this latter event the front ends of the spring arms 16 are rigidly fixed to the frame means 10.

Figure 2:
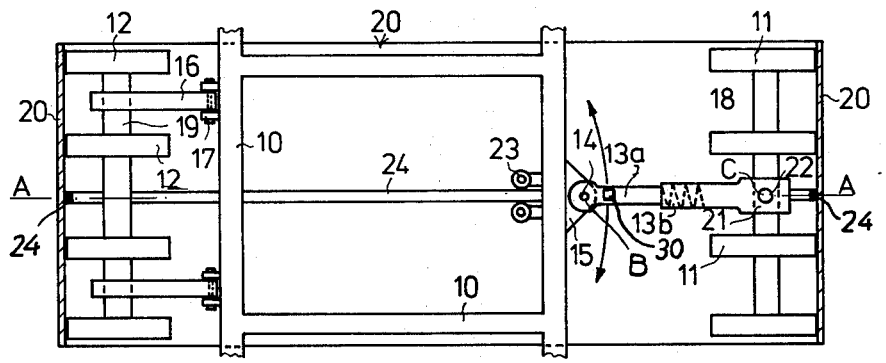
FIG. 2 is a schematic sectional plan view taken along line II—II of FIG. 1 in the direction of the arrows.

According to the embodiment of the invention which is illustrated in FIGS. 1-4, a connecting means 13 connects the front end roll means 11 to the frame means 10 for the purpose of rendering the front end roll means 11 turnable about a substantially upright axis, when the vehicle executes a turn, while at the same time the connecting means 13 provides for the front end roll means 11 the capability of assuming freely whatever position is determined by the track means 20 itself. The connecting means 13 is pivotally connected with the frame means 10 and extends along a substantially horizontal axis A—A, shown in FIG. 2, when the track means 20 is straight as illustrated in FIG. 2, this axis A—A being situated in a vertical plane which is situated midway between the opposite sides of the track means 20 when the latter is straight as illustrated in FIG. 2.

The connecting means 13 is pivotally connected to the frame means 10 by way of a pivot pin 14 which is vertical and passes through openings in upper and lower parts of a rear bifurcated portion of component 13a of the connecting means 13, this pin also passing through an opening in a lug 15 which is fixed to and projects from a forward portion of the frame means 10 and which is received in the space between the bifurcated portions of the rear component 13a of the connecting means 13.

In order to steer the vehicle a steering means 30 which is schematically shown in FIG. 2 is connected with the component 13a, and by way of the steering means 30 it is possible for the operator to swing the component 13a about the axis determined by the pivot pin 14 in one direction or the other as shown by the arrows in FIG. 2.

The connecting means 13 also includes a forward component 13b which at its rear portion is tubular for telescopically receiving the component 13a. In the interior of the component 13b is a spring means 25 which urges the telescoped components 13a and 13b apart from each other.

The front end region 21 of the component 13b is pivotally connected with the shaft means 18 of the front end roll means 11 in such a way that the shaft 18 is freely turnable with respect to the component 13b about an upright axis C determined by the axis of the pivot 22 shown schematically in FIGS. 1 and 2. The details of this pivotal connection of the connecting means 13 to the end roll means 11 are most clearly shown in FIG. 6 where the component 13 is connected to the illustrated shaft 18 in the same way as the component 13b in FIGS. 1 and 2. Thus, as may be seen from FIG. 6, the shaft 18 is surrounded by a ring or sleeve 38 which is freely turnable around the shaft 18. The axial position of the sleeve 38 on the shaft 18 is determined by a pair of collars 36 which are fixed to the shaft 18 in engagement with the opposite ends of the sleeve 38. The sleeve 38 fixedly carries a pair of coaxial pins 40 which thus correspond to the pivot 22 shown in FIGS. 1 and 2. These pins 40 respectively pass through openings formed in the bifurcated portions 42 at the front end region of the component 13 shown in FIG. 6. Thus, through this very same structure the component 13b of FIGS. 1 and 2 is pivotally connected with the shaft 18 to provide for the front end roll means 11 the capability of freely turning with respect to the connecting means 13 about the upright axis C which coincides with the axis of the pivot 22.

It is thus apparent that the spring means 25, in the from of a coil spring compressed between the telescoped components 13a and 13b, serves to maintain the track mmeans 20 under constant tension while at the same time urging the front end roll means 11 forwardly away from the frame means 10 into engagement with the inner surface of the endless track means 20. It will be seen that with this construction the front end roll means 11 is capable of freely turning about the upright axis C in the substantially horizontal plane into a position determined by the track means 20. If desired it is also possible to provide additional springs which tend to return the shaft 18 to the position shown in FIG. 2 it extending perpendicularly with respect to the axis A—A, and in this event the shaft 18 will be capable of turning in opposition to such springs, although such springs are not essential and the shaft 18 can be freely turnable with respect to the component 13b as illustrated in FIG. 2. Thus, when the steering means 30 is operated to turn the connecting means 13a and 13b in one direction or the other about the pivot 14, the pivot axis C will also turn through the same angle as the connecting means 13, and the front end roll means 11 will be angularly displaced about the axis determined by the pin 14, but at the same time the end roll means 11 is free to assume a position determined by the front portion of the track means 20 which is guided around the end roll means 11 so that the front end roll means 11 itself need not necessarily turn through the same angle as that through which the connecting means 13 is turned about the axis determined by the pivot 14.

As is schematically shown in FIG. 2, and fragmentarily illustrated in FIG. 1, in the central vertical plane occupied by the horizontal axis A—A the endless track means 20 fixedly carries at its inner surface an elongated endless substantially non-stretchable band or equivalent track reinforcement 24. This central non-stretchable band 24 may be made of a suitable metal, for example and is fixed with the inner surface of the endless track 20. A guide means 23 cooperates with the band 24. This guide means 23 includes a pair of lower rollers situated next to the lower inner surfce of the endless track 20 and engaging opposite sides of the band 24 as well as a pair of upper rollers 23 situated directly over the rollers 23 shown in FIG. 2 and engaging the opposite sides of the band 24 next to the upper inner surface of the endless track means 20. The shafts which carry the rollers 23 are in turn fixedly carried by suitable rigid arms which are fixed to the frame means 10 in the manner schematically illustrated in FIGS. 1 and 2. Thus, rollers or wheels 23 serve to brace and guide the central nonstretchable band 24. Of course, when the track 20 is straight, during travel of the vehicle along a straight path, the telescoped components of the connecting means 13 are perpendicular to the shaft 18.

Figures 3, 4:
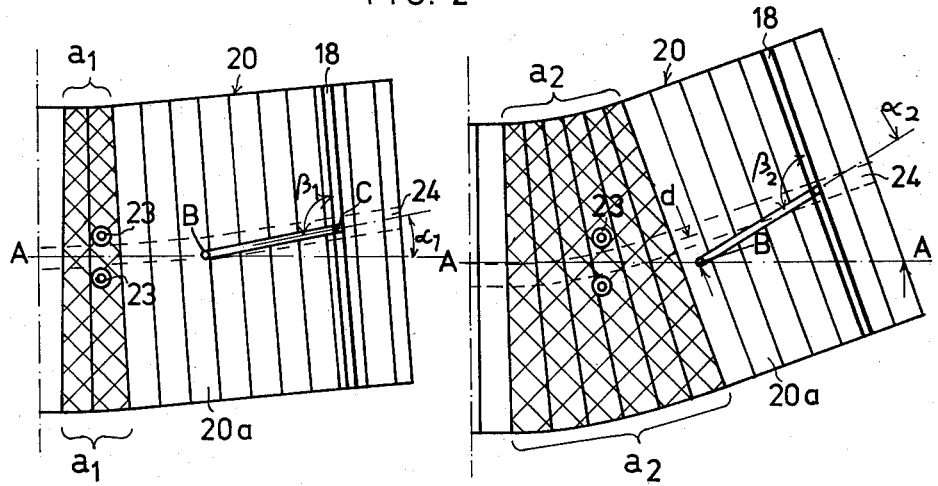
FIG. 3 is a schematic illustration of the principle of operation of the invention in the case where the vehicle executes a relatively small turning angle having a relatively large radius of curvature.
FIG. 4 shows schematically how the structure of FIG. 3 operates when the vehicle executes a larger turning angle of a smaller radius of curvature.
Figure 5:
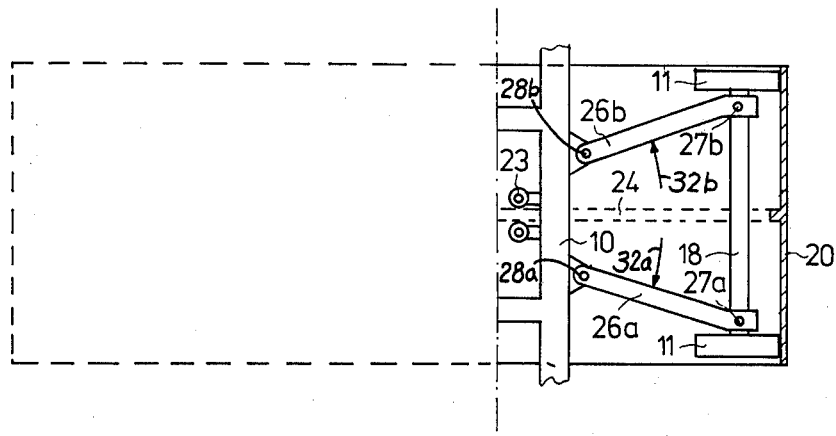
FIG. 5 is a schematic plan view of another embodiment of the invention with FIG. 5 showing the track in a straight condition.

In the embodiment of the invention which is illustrated in FIG. 5, the connecting means is constructed differently from the connecting means 13 of FIGS. 1 and 2. In the case of FIG. 5 the connecting means includes a pair of links 26a and 26b in the form rigid elongated arms which at their rear ends are pivotally connected to the frame means 10 by way of a pair of vertical pivots 28a and 28b, respectively. At their front ends the links 26a and 26b are pivotally connected with the shaft 18 of the front end roll means 11 by way of vertical pivots 27a and 27b. The front end regions of the links 26a and 26b and the pivots 27a and 27b may all have the structure shown for component 13 and the pivotal connection thereof to the shaft 18 in FIG. 6, and described above. Thus it will be seen that with the embodiment of FIG. 5 the links of the connecting means are situated on opposite sides of and spaced from the central vertical plane which is situated midway between the opposed side edges of the track means 20 when the latter is straight as illustrated in FIG. 5. Moreover, the distance between the pivots 27a and 27b is greater than the distance between the pivots 28a and 28b, so that while the links are arranged symmetrically with respect to the central vertical plane they provide a trapezoidal type of linkage. When executing a left turn, a steering means 32b, schematically shown by the arrow in FIG. 5, will turn the link 26b in a counterclockwise direction about the pivot 28b, while the link 26a will be free to follow the shaft 18 with the latter together with the remainder of the front end roll means 11 being free to assume an angular position determined by the front end of the track means 20 itself. When executing a right turn, the steering means 32a, schematically illustrated by the arrow in FIG. 5, will turn the link 26a in a clockwise direction, as viewed in FIG. 5, about the pivot 28a, and at this time the link 26b will be free to follow the movement of the shaft 18, so that at this time also the front end roll means 11 will be capable of assuming an angular position determined by the track means 20. Thus while the front end roll means 11 is guided by the connecting means 26a, 26b of FIG. 5, at the same time the front end roll means 11 is free to assume an angular position determined by the track 20 itself. The principle of operation of the embodiment of FIGS. 1 and 2, as well as the embodiment of FIG. 5, is illustrated in FIGS. 3 and 4. It is to be remembered that an important feature of the method and structure of the invention is that the shaft 18 of the front end roll means 11 is capable of assuming, either substantially free of restriction as shown in FIGS. 1 and 2, or under positive guidance as shown in FIG. 5, or under spring-loading, that position which the endless track means 20 gives to the shaft 18 or prescribes for it as the front end roll means 11 is angularly displaced into different angular positions about the upright axis determined by the pivot 14 in the case of FIGS. 1 and 2 or determined by the pivot 28b in the case of a left turn in FIG. 5 or the pivot 28a in the case of a left turn in FIG. 5 or the pivot 28a in the case of a right turn in FIG. 5. Of course it is to be understood in connection with FIG. 5 that if desired the steering means may turn the link 26b in a clockwise direction in order to bring about a right turn, in which case the link 26a would follow freely the movement of the shaft 18, while guiding the latter, and in this event the steering means may act on the link 26a to turn the latter in a counterclockwise direction to effect a left turn, in which case the link 26b would be free to assume an angular position determined by the shaft 18 which in turn has its angular position determined by the track 20.

As may be seen from FIG. 3, the track 20 is made up of a number of individual transverse elements 20a, and the track means 20 is shown in FIG. 3 in the position which it takes when a relatively small turning angle $\alpha_1$ is provided. The track 20 starts to curve at the region of the guide means 23. In the case of a relatively small turning angle $\alpha_1$ the curved portion of the track means 20 is relatively short, indicated by the shaded components 20a which occupy the region $a_1$ indicated in FIG. 3. Forwardly and rearwardly of the curved region $a_1$, the track means 20 is straight. The inherent characteristics of the track means 20 causes the shaft 18 to assume such a position that the angle $\beta_1$ is greater than 90°. It is understood, therefore, that with relatively small turning angles $\alpha_1$ the track means 20 will have to the rear of the guide means 23 an elongated straight portion, then a relatively short curved portion $a_1$ followed by another straight portion extending up to the front end of the track means 20 where the front end roll means 11 is situated. The curved portion $a_1$ of the track means is situated substantially centrally with respect to the bracing wheels 23. Thus, while the shaft 18 and the remainder of the front end roll means has turned together with the connecting means, the connecting means has turned through the angle $\alpha_1$ but because the angle $\beta_1$ is somewhat greater than 90° it is clear that the front end roll means has in fact turned through an angle somewhat less than the angle $\alpha_1$ with respect to the axis around which the connecting means itself turns.

In the case of FIG. 4, the connecting means together with the front end roll means turns about the upright axis B determined by the pivot 14 of FIGS. 1 and 2 or either of the pivots 28a or 28b of FIG. 5, but in the case of FIG. 4 a larger turning angle $\alpha_2$ is provided so that the vehicle turns according to a smaller radius of curvature. In this case also the guide means 23 cooperates with the band 24 to limit the curving of the track to the region $a_2$ which while larger than the region $a_1$ of FIG. 3 is also situated only where the guide means 23 is located, this curved region $a_2$ being preceded and followed by straight regions of the track means 20. With an increased turning angle which increases from $\alpha_1$, in FIG. 3, to $\alpha_2$, in FIG. 4, it is apparent that the angle between the connecting means and the shaft 18 also increases since the angle $\beta_2$ of FIG. 4 is greater than the angle $\beta_1$ of FIG. 3. However, in this case also the angle $\beta_2$ is greater than 90° and thus the shaft 18 while being angularly displaced together with the connecting means about the upright axis B, nevertheless is angularly displaced about this axis to an extent less than the connecting means itself because the front end roll means is free to assume an angular position determined by the track means itself.

Inasmuch as with the invention it is possible for the shaft 18 to conform to positions determined by the track means 20 in an unrestricted or elastic or positively guided manner, the turning ability of the vehicle can be made greater than has heretofore been possible and the assisting steering moment can be increased. The moment arm which is involved in generation of the assisting steering moment is the moment arm $d$ indicated in FIG. 4. Thus, with the invention it is possible to achieve a lighter steering force and lower stresses on the track means with the advantage that the track means need not constitute a rigid entity with respect to the front end roll means, as is essential with previously known endless track vehicles.

Figure 6:
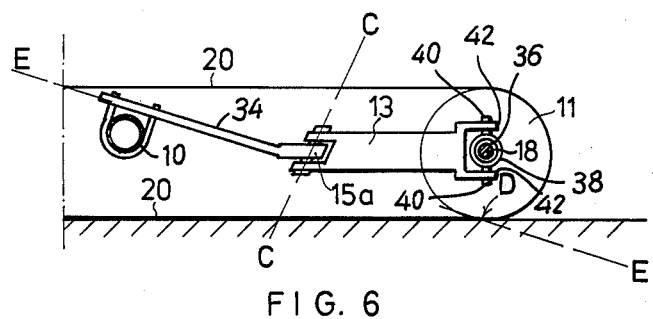
FIG. 6 is a fragmentary schematic side elevation illustrating a further construction of a turnable front part of an endless track vehicle according to the invention.
Figure 7:
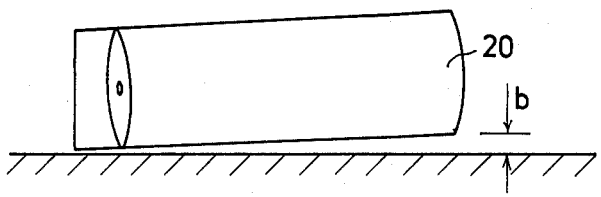
FIG. 7 shows the structure of FIG. 6 as it appears when looking toward the front end of the vehicle with the endless track in a curved condition.

Further features of the invention are illustrated in FIGS. 6 and 7. In the example shown in FIG. 6, a connecting means 13 made up of telescoped components, spring-urged apart from each other as shown in FIGS. 1 and 2, is operatively connected to the front end roll means 11 in exactly the manner described above in connection with FIGS. 1 and 2. However, at its rear end the connecting means 13 is connected with a pivot means 15a, the axis C—C of which is inclined upwardly and forwardly considered in the direction of forward travel of the vehicle, as indicated in FIG. 6. In this case the bifurcated rear portion of the rear telescoped component of the connecting means 13 has the opening in its lower arm situated rearwardly with respect to the opening in its upper arm to provide the inclined pivot axis C—C shown in FIG. 6. Between these bifurcated arms there is received a front end region of an elongated spring means 34 in the form of an elongated spring arm made of a suitable leaf spring structure. This leaf spring structure 34 is fixedly connected with the frame means 10 in the manner shown schematically in FIG. 6 and it is located in the central vertical plane of the vehicle. Thus, the spring means 34 extends in the direction of travel of the vehicle although it is inclined forwardly and downwardly as illustrated in FIG. 6. As a result of the inclination of the pivot axis C—C, the front end region of the track means 20 will rise at the inner side of a curve executed by the vehicle, as indicated by the dimension $b$ in FIG. 7. As a result of this feature the tendency of the track means to burrow or dig into the surface on which the track means travels, very common in previously known endless track vehicles, is avoided with the structure of the invention.

As is apparent from FIG. 6, the elongated spring arm 34 extends along a straight line E—E which is inclined forwardly and downwardly with respect to the forward direction of travel of the vehicle, and this straight line E—E is situated very closely adjacent to the transverse line of contact of the endless track means 20 with the surface on which the vehicle travels, this being the front transverse line of contact situated beneath the shaft 18. As a result the line E—E intersects the front transverse line of contact at the point D illustrated in FIG. 6. Thus, the construction is such that the straight line E—E along which the spring means 34 extends will pass through the point D where the endless track means 20 meets the surface on which the vehicle travels. As a result of this feature the vertical elastic yielding movement of the front end roll means 11 will not result in any lateral "working" of the endless track means. This latter type of lateral movement of the track means has been found in previously known constructions to unfavorably influence the driving stability of the vehicle.

What is claimed is:

1. In a method of operating a vehicle which has front and rear end roll means and an endless track means guided around said front and rear end roll means and capable of becoming shorter on one side and longer on an opposite side when the vehicle executes a turn, the step of angularly displacing at least one of said end roll means about an upright axis in a substantially horizontal plane while executing a turn with the vehicle, and simultaneously with the angular displacement of said one end roll means freeing the latter to assume an angular position determined by the endless track means which engages one end roll means, and including the step of turning a steering component connected between a frame of the vehicle and said one end roll means through a given angle with respect to the frame of the vehicle when executing a turn while simultaneously permitting said one end roll means to turn with said steering component but at an angle less than said given angle with respect to said frame while said one end roll means has its extent of angular displacement determined by said endless track means.

2. A method as recited in claim 1 and including the step of continuously urging said one end roll means into engagement with said endless track means.

3. In a method as recited in claim 1 and including the step of guiding said one end roll means for angular displacement by way of links pivotally connected on the one hand to said one end roll means and on the other hand to a frame of the vehicle.

4. In a vehicle, frame means, endless track means extending longitudinally of said frame means and capable of becoming longer on one side and shorter on an opposite side when the vehicle executes a turn, front and rear end roll means around which said endless track means extends to be guided thereby during travel of the vehicle, and connecting means connecting at least one of said end roll means to said frame means for angular displacement with respect thereto about an upright axis during execution of a turn, and said connecting means providing for said one end roll means the capability of assuming an angular position determined by said endless track means, said one end roll means including a shaft means extending transversely of said frame means and roll means carried by said shaft means and engaging said endless track means, said connecting means extending between said shaft means and frame means and being pivotally connected at least to said shaft means so that said one end roll means is capable of assuming an angular position determined by said endless track means.

5. The combination of claim 4 and wherein a spring means forms part of said connecting means and urges said one end roll means into engagement with said endless track means.

6. The combination of claim 4 and wherein said connecting means includes a pair of elongated components telescopically connected to each other and respectively connected pivotally with said frame means and shaft means.

7. The combination of claim 6 and wherein a spring means is operatively connected with said components for urging them apart from each other and for thus urging said one end roll means into engagement with said endless track means.

8. The combination of claim 7 and wherein a longitudinal central horizontal axis of the vehicle is situated in a vertical plane situated midway between opposed sides of said endless track means when the vehicle travels along a straight path, and said telescoped components being situated in said plane when the vehicle travels along a straight path while being angularly displaced to one side of said plane when the vehicle executes a turn.

9. The combination of claim 4 and wherein a longitudinal central substantially horizontal axis of the vehicle is situated in a vertical plane which is situated midway between opposed sides of said endless track means when the vehicle travels along a straight path, and said connecting means including a pair of links respectively situated on opposite sides of and spaced from said plane and each pivotally connected on the one hand to said shaft means and on the other hand to said frame means.

10. The combination of claim 9 and wherein said links are symmetrically situated with respect to said plane when the vehicle travels along a straight path.

11. The combination of claim 10 and wherein the distance between the pivotal connections of said links to said shaft means is different from the distance between the pivotal connections of said links to said frame means.

12. The combination of claim 11 and wherein the distance between the pivotal connections of said links to said shaft means is greater than the distance between the pivotal connections of said links to said frame means.

13. The combination of claim 4 and wherein a pivot means connects said connecting means to said frame means for turning movement with respect thereto about an upright axis which is inclined forwardly and upwardly considered in the direction of forward travel of the vehicle.

14. The combination of claim 4 and wherein an elongated spring means forms part of said connecting means and connects the remainder thereof to said frame means, said elongated spring means rendering said connecting means yieldable in a vertical plane and extending along a straight line which is inclined forwardly and downwardly from said frame means and which is situated closely adjacent to a transverse front line of contact between said track means and the surface on which the vehicle travels, said transverse front line of contact being situated just beneath said one end roll means.

15. In a vehicle as recited in claim 4, said connecting means having a pair of components one of which is connected to said one end roll means and the other of which is connected to said frame means, and said pair of components being pivotally connected to each other for turning movement about an axis which is inclined upwardly and forwardly with respect to the direction of travel of the vehicle.

16. The combination of claim 15 and wherein that one of said components which is connected to said frame means is in the form of an elongated spring arm.

17. The combination of claim 16 and wherein said elongated spring arm extends along a straight line which is inclined forwardly and downwardly with respect to the direction of travel of the vehicle and which is situated closely adjacent to a front transverse line of contact between said endless track means and the surface on which the vehicle travels with said front transverse line of contact being situated beneath said one end roll means.

18. The combination of claim 4 and wherein said endless track means has an inner surface carrying a longitudinal central substantially non-stretchable band projecting from said inner surface, and said frame means carrying at the region where said connecting means is connected to said frame means a guide means engaging and guiding said band for limiting the curving of said endless track means to its region where said band is engaged by said guide means.

* * * * *